US 6,681,304 B1

(12) United States Patent
Vogt et al.

(10) Patent No.: US 6,681,304 B1
(45) Date of Patent: Jan. 20, 2004

(54) METHOD AND DEVICE FOR PROVIDING HIDDEN STORAGE IN NON-VOLATILE MEMORY

(75) Inventors: James R. Vogt, El Dorado Hills, CA (US); Robert N. Hasbun, Placerville, CA (US); John P. Brizek, Placerville, CA (US)

(73) Assignee: Intel Corporation, Santa Clara, CA (US)

(*) Notice: Subject to any disclaimer, the term of this patent is extended or adjusted under 35 U.S.C. 154(b) by 171 days.

(21) Appl. No.: 09/608,476

(22) Filed: Jun. 30, 2000

(51) Int. Cl.[7] .............................................. G06F 12/14
(52) U.S. Cl. ...................... 711/164; 711/100; 711/103; 711/163
(58) Field of Search ................................ 711/100, 102, 711/103, 154, 163; 380/4

(56) References Cited

U.S. PATENT DOCUMENTS

| | | | | |
|---|---|---|---|---|
| 5,093,787 A | * | 3/1992 | Simmons | 705/33 |
| 5,144,659 A | * | 9/1992 | Jones | 384/4 |
| 5,293,424 A | * | 3/1994 | Holtey et al. | 380/23 |
| 5,469,564 A | * | 11/1995 | Junya | 713/202 |
| 5,491,827 A | * | 2/1996 | Holtey | 711/163 |
| 5,673,222 A | * | 9/1997 | Fukumoto et al. | 365/185.04 |
| 5,742,935 A | * | 4/1998 | Hazen et al. | 711/152 |
| 5,949,882 A | * | 9/1999 | Angelo | 380/25 |
| 6,157,953 A | * | 12/2000 | Chang et al. | 709/225 |
| 6,199,167 B1 | * | 3/2001 | Heinrich et al. | 713/202 |
| 6,240,519 B1 | * | 5/2001 | James, Jr. et al. | 713/202 |
| 6,298,421 B1 | * | 10/2001 | Minamizawa et al. | 711/151 |

* cited by examiner

Primary Examiner—Tuan V. Thai
(74) Attorney, Agent, or Firm—Blakely, Sokoloff, Taylor & Zafman LLP

(57) ABSTRACT

A method and device for providing hidden storage in non-volatile memory. A memory device is disclosed comprising a main flash array. A hidden storage area is connected to the main flash array. The hidden storage area can not be accessed without a valid password according to the present memory device.

23 Claims, 8 Drawing Sheets

METHOD AND DEVICE FOR PROVIDING HIDDEN STORAGE IN NON-VOLATILE MEMORY

FIELD OF THE INVENTION

The present invention relates to digital computer memory devices and, more specifically, to a method and device for providing hidden storage in non-volatile memory.

BACKGROUND OF THE INVENTION

The world is increasingly becoming connected via wired and wireless networks. This connectivity means that an increased level of information and service is being delivered over networks. As the amount of information increases, so does the value of this information. As this value increases, the threat of others gaining illicit access to this information also increases. To protect against these mounting threats, security measures are required. And as security measures are put into place and trust is gained, further valuable information is sent which leads to a cyclical evolution of increased value, increased threat, and increased security.

Adding security to complex, open, and rapidly evolving networks is not simple. There are many exploitable elements in most network architectures. Untrusted platforms, unprotected communication links, communication protocols that do not address security and poor implementation of standards (where they exist) are all exploitable by sophisticated adversaries. These security holes must be fixed for the full business and commerce potential of networks to be realized. The result is opportunity for companies that can provide solutions.

Today, most security is performed in software. Software is known for its inability to keep secrets and perform security functions privately and reliably. To provide stronger security, hardware needs to be added to perform some of the security functions. A trusted operating system is not required if the encryption is performed in hardware. This reflects a basic security truth axiom—hardware is much better than software in providing high-grade security solutions. Given the escalating need for security in connected devices, an opportunity now exists to add value to systems which contain flash memory by embedding security primitives in the flash memory that can easily be applied to standards based security solutions.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Techniques for implementing hidden storage in a non-volatile memory storage are disclosed. As will be discussed in greater detail below, in one embodiment of the invention, a memory device is disclosed comprising a main flash array. A hidden storage area is connected to the main flash array. The hidden storage area can not be accessed without a valid password.

Figure 1:
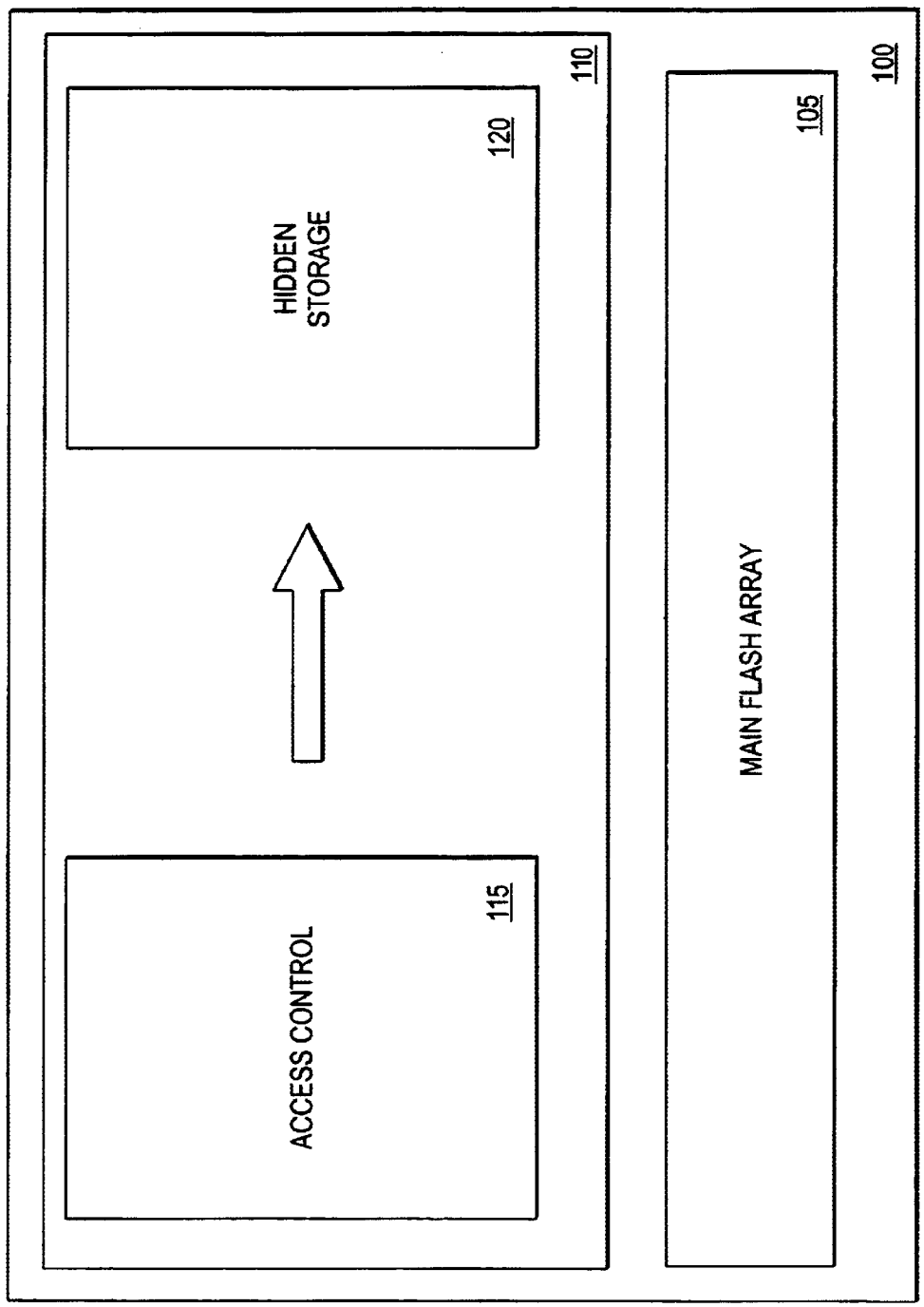
FIG. 1 illustrates a functional block diagram of hidden storage in Flash device 100.

FIG. 1 illustrates a functional block diagram of hidden storage in Flash device 100. Flash device 100 includes a hidden storage area 110, separate from the remainder of the Flash device 100. Main Flash array 105 may be accessed without a password or similar security mechanism. However, hidden storage 120 may only be accessed via access control 115.

Hidden storage 120 is flash memory that is password protected from both read and write modify access. Hidden storage 120 is used to protect an individual's secrets. Examples of secrets include private keys, credit information, phone directories, or any other information that a user or system deems as secret. Without the password, memory locations protected by that password cannot be read from or written to. Attempting to read the hidden storage 120 locations results in non-characteristic data being returned. After entering the password, the user can read the contents of hidden storage 120 and can also change or add to the contents.

Major markets that could benefit from inclusion of security primitives in flash memory are cellular phones, personal digital music players (MP3 players), Personal Computer Companions (PCCs), and set top boxes (STBs). With the exception of the set top box, these are applications that demand a high degree of portability. As such, they require small size, low power, and integration of functions to as great an extent as possible. In each instance, the flash memory is part of a circuit to provide non-volatile memory that is embedded in the device. In addition to the need for non-volatile memory, each of these devices requires some degree of security.

Hidden Storage

Figure 2:
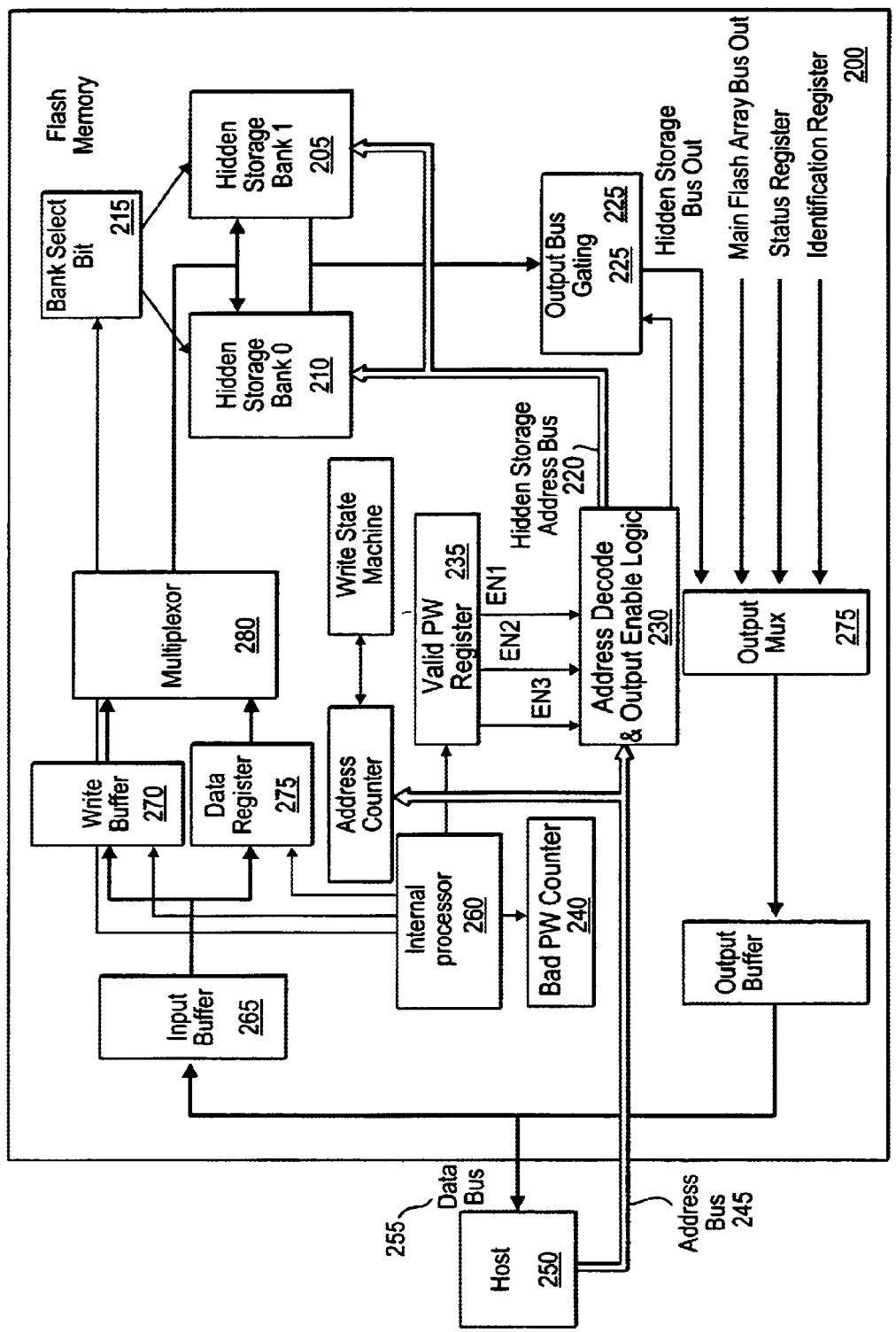
FIG. 2 illustrates a block diagram of hidden storage reflecting the Flash Wallet architecture interface 200.

In one embodiment of hidden storage, referred hereafter as the "Flash Wallet architecture," a valid password is entered, and the flash wallet architecture gives the host direct access to hidden storage. FIG. 2 illustrates a block diagram of hidden storage reflecting the Flash Wallet architecture interface 200. New functional blocks required for hidden storage are shaded in the diagram. Note that the unshaded blocks representing flash memory functions are for reference purposes.

Flash Wallet architecture 200 includes address decode and output enable logic 230 connected to the address bus 245, hidden storage address bus 220, valid password register 235, hidden storage bank 0 210, hidden storage bank 1 205, and output bus gating 225. The address decode and output enable logic 230 control read and write access to hidden storage as will be described below. The valid password (PW) register 235 is controlled by internal processor 260 and generates valid password signals EN1, EN2, and EN3 as will be described below.

Bad password counter (BPC) 240 is connected to internal processor 260. BPC 240 is a register used to count and maintain a cumulative record of incorrect password entries as will be described below. Hidden storage bank 0 210 and hidden storage bank 1 205 are memory cells used for storing secret information. Banks 205 and 210 are connected to bank select bit 215, input multiplexer 280, output bus gating 225, and address decode and output enable logic 230. The organization of Banks 205 and 210 will be discussed in detail below. Bank select bit (BSB) 215 is controlled by internal processor 260 and determines which hidden storage bank (Bank 0 210, or Bank 1 205) is selected.

Output bus gating 225 is connected to bank 0 210, bank 1 205, output multiplexer 275 and address decode and output enable logic 230. Output bus gating 225 controls access to bank 0 210 and bank 1 205.

The Flash Wallet architecture 200 interfaces with the host 250 through the data 255 and address 245 busses. A command set to create and manage passwords does need to be added. The command set should be based on the password commands defined for protected storage. After a password has been entered and verified, the host can access hidden storage 205, 210 as it would any other addressable location in the memory.

The following password related operations are performed by device 200:
  Create User Password;
  Create System Administrator Password;
  Create Recovery Password;
  Verify User Password;
  Verify System Administrator Password;
  Verify Recovery Password;
  Update/modify User Password;
  Update/modify System Administrator Password; and
  Update/modify Recovery Password.

The following types of file/data related operations are also performed by device 200. All of these operations assume that a valid password for the corresponding operation has been entered. The host system 250 needs to manage these files, since hidden storage 205, 210 is directly accessible to the host 250 after a valid password is entered.
  Create (store) new file;
  Read file;
  Update/modify file; and
  Erase file.

Address Decode and Output Enable Logic

Figure 3:
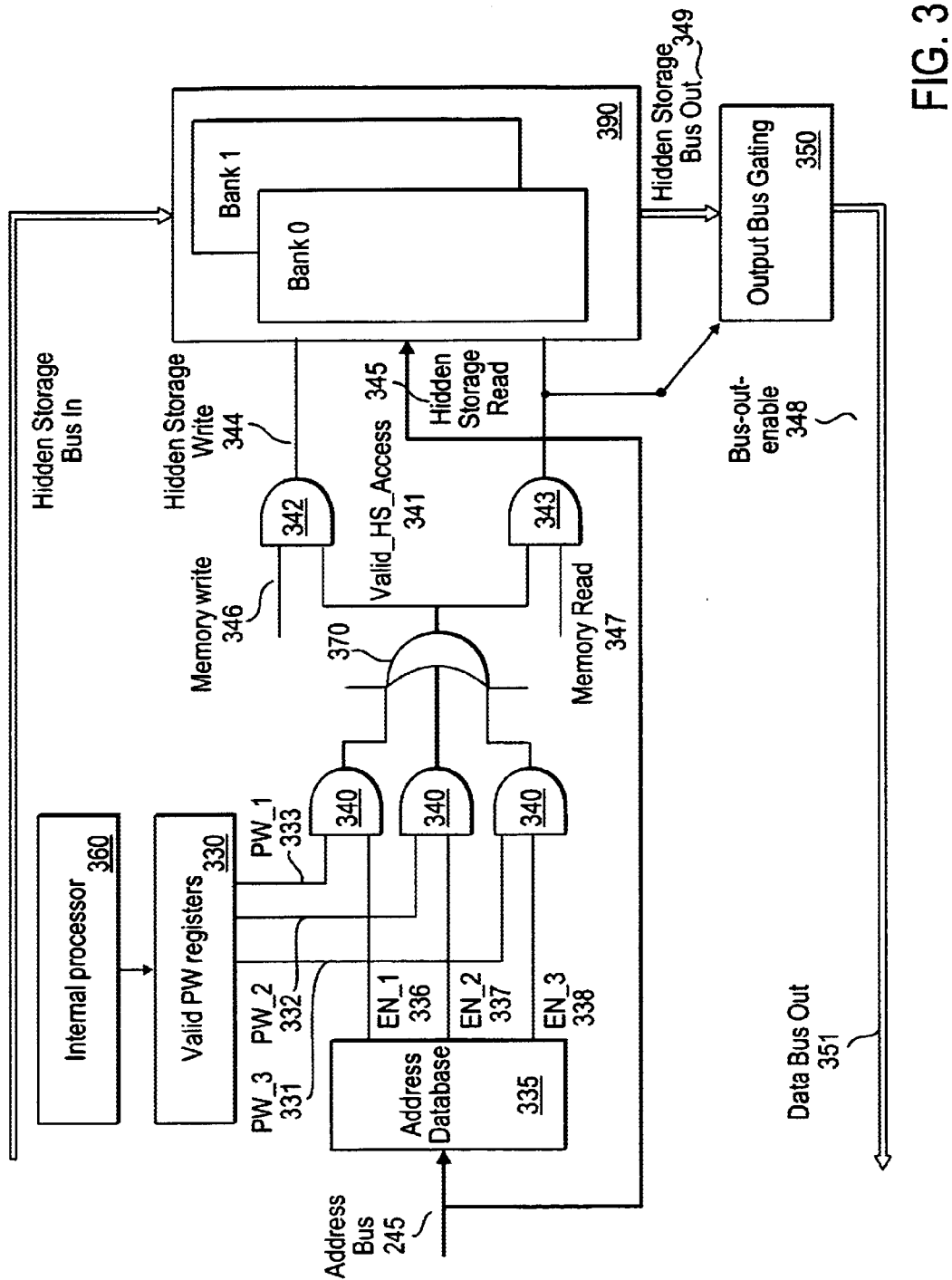
FIG. 3 illustrates Address Decode and Output Enable Logic.

The address decode and output enable logic are the gate level devices that control read and write access to hidden storage. FIG. 3 illustrates Address Decode and Output Enable Logic. The output of the volatile valid password register (PW_1 333, PW_2 332, and PW_3 331) is controlled by the internal microprocessor. These bits are asserted when the internal processor verifies that a correct password has been entered. For example, if the password for user 2 has been entered and verified, the internal processor asserts PW_2 332. These bits are not mutually exclusive— any two bits or even all three bits can be asserted provided the user has entered the correct password for that user space. In this way, one user may be able to access the full capacity of hidden storage.

The address decoder block decodes the address bus to create three signals, EN_1 336, EN_2 337, and EN_3 338. These signals are asserted when the address on the bus corresponds to a hidden storage location for that specific user. For example, EN_1 336 is asserted when the address bus maps to a location within the range of hidden user space 1 312. Similarly, EN_2 337 and EN_3 338 indicate access into the hidden storage space for users 2 and 3 respectively. The PW and EN signals are logically "ANDed", so that the output of the "AND" function 340 is true only if a valid password has been entered and the address on the bus lies within the user space corresponding to the entered password. The output of the three "AND" (PW and EN) gates 340 is logically "ORed" to create the signal Valid_HS_Access 341. This signal is asserted when any combination of valid password and valid address is true. In one embodiment, Valid_HS_Access 341 is in turn logically "anded" with memory read and memory write to create the hidden storage read 345 and hidden storage write 344 signals. Hidden storage read 345 is also used to control the output bus gating 350. When hidden_storage_read is asserted 345, the hidden storage bus out 349 is multiplexed onto data bus out 351. Note that this logic does not control read or write access to password storage.

In FIG. 3, the valid password register 330 is a volatile register controlled by the internal processor 360. When a valid password is verified by the internal processor 360, a bit in the valid password register 330 is set corresponding to the identity of the password entered. The valid password signals are logically "ANDed" with decoded address space corresponding to each user. For example, if a valid password for user 2 has been entered, the internal processor 360 asserts signal VALID_PW_2 332. When a read operation occurs in the user space for user 2 occurs, the EN2 337 output from the block labeled address decoder is asserted. Signals EN2 337 and VALID_PW_2 332 are logically "ANDed", which provides a logically true signal to the or gate 370. As a result, Valid_HS_Access 341 is asserted, and logically "ANDed," with the memory read signal 347. As a result, Bus_out_ enable 348 is asserted, allowing the internal data bus output buffer to be enabled. If no valid passwords have been entered, each of the AND gates 340 is disabled, and only the assertion of signal main_flash_address_space enables the bus output. Main_flash_address_space is asserted when the address decoder 335 decodes a read operation for any part of flash memory except for hidden storage 390.

Write operations to hidden storage 390 are somewhat similar. The valid password register 330 and address decoder logic 340 are used in exactly the same way. For a write to occur to hidden storage, a valid password must have been entered and the address being written to must be in the valid user space for the individual that entered the password. But for write operations, the "ANDed" output of valid_PW_(n) 331–333and EN(n) 333–338 are logically "ANDed" with write enable.

Hidden Storage Organization

Figure 4:
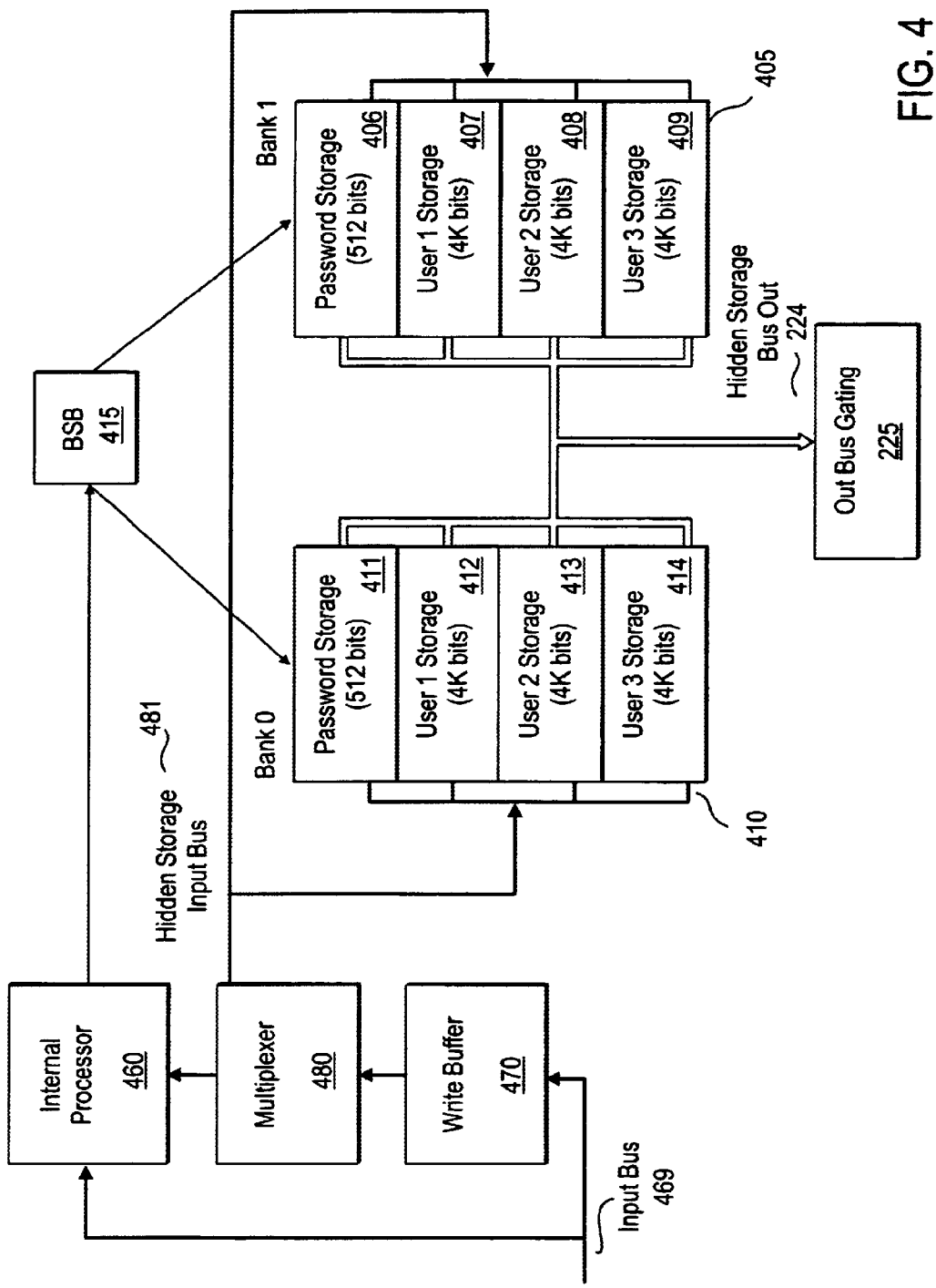
FIG. 4 illustrates a block diagram of Hidden storage organization.

FIG. 4 illustrates a block diagram of Hidden storage organization. Each bank provides a fixed amount of hidden storage space per user, with additional hidden storage space for password storage. Bank 0 410, is divided into 4 blocks. Password Storage blocks 406 and 411 are used for storing passwords. User storage blocks 412–414 and 407–409 store secret data for users. In one embodiment 512 bits are allocated for password storage. User space is allocated for three users, with each provided a number of bits of storage. In one embodiment, 4 k bits are allocated for each user storage block. A number of bits are allocated for password storage. User space can be directly accessed by the host over the data bus (provided a valid password is entered), but password storage cannot be accessed. The internal processor 460 performs password operations. Passwords are never output onto the external data bus.

The non-volatile Bank Select Bit (BSB) 415 determines which hidden storage bank is selected. The internal processor 460 controls the BSB 415. When the BSB 415 is "0", hidden storage bank 0 410 is selected. When the BSB 415 value is "1", hidden storage bank 1 405 is selected. At any time, the value of the BSB 415 selects the current valid hidden storage bank.

Passwords are entered into password storage 406 or 411 by the internal processor 460. User passwords are input to the internal processor 460 over the data path as part of a create or change password command. In one embodiment, passwords consist of up to eight characters, with one byte of storage allocated for each character. The internal processor 460, utilizing a write state manager (not shown in the figure) writes the eight characters comprising the password into password storage 406 or 411. The data path is through the multiplexer 480 to the hidden storage input bus 481. The address space corresponding to password storage locations is outside the valid address space for hidden storage 406 or 411 that can be accessed by the host 250.

Passwords occupy fixed addresses in memory space. Only the BSB 415 changes as the bank select changes. User data is read from hidden storage 406 or 411 directly by the host system. A read operation can be performed if two conditions are met. First, a valid password has been entered and second, the address space being accessed is in the hidden storage address range for that user (see below for a detailed explanation of the address decode logic.) During a read operation, data is read out of the user space of the selected bank on the "hidden storage bus out" 224 and then passes through the output bus gating 225 before going to the output multiplexer 275 (internal to flash) and then onto the external data bus.

User operations for writing to hidden storage are performed by the host system, but the internal microprocessor 460 manages the details of the write operation. For a write operation to be valid, two conditions must be met. First, a valid password for user (n) has been entered and second, the address space being written to is part of user (n)'s address space. If these conditions are satisfied, the write operation is enabled and is similar to a write into main flash memory.

Write operation example

For this example, we can assume the following initial conditions. One bank is current and one is erased. Here, assume bank 0 410 is current and bank 1 405 is erased. Second the BSB 415=0, so it points to bank 0 410, the current bank. User (n) has entered a valid password, allowing access to user space (n), and the write address being performed lies within the range of user space (n). The sequence of events is described as follows.

Figure 5:
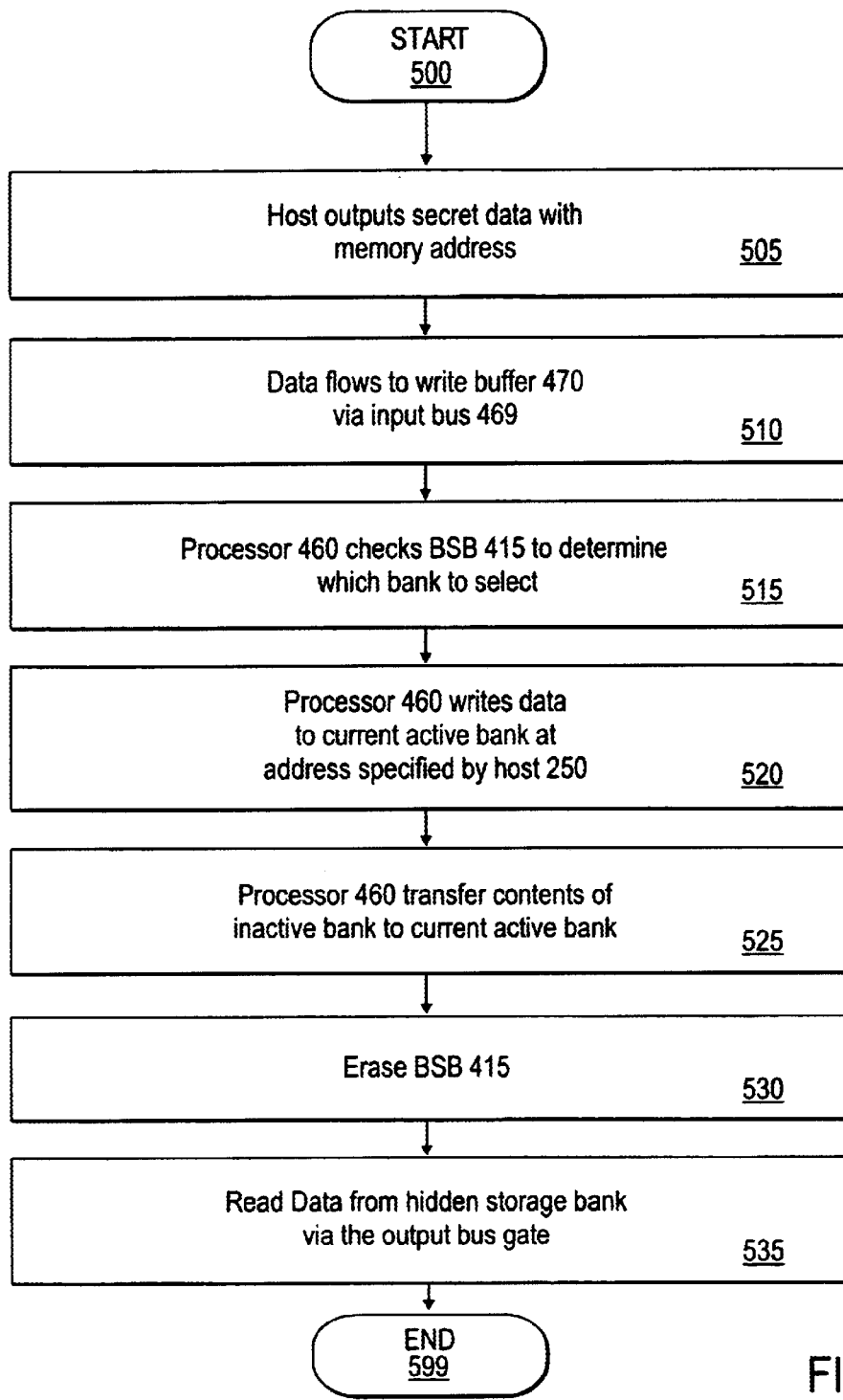
FIG. 5 illustrates a flow diagram of a write operation process. The process begins in block 500.

FIG. 5 illustrates a flow diagram of a write operation process. The process begins in block 500. In block 515, the host 250 outputs new data on the data bus 255 to the flash 200 along with the memory address(es). In processing block 520, inside the flash 200, the new data comes into the write buffer 470 via the input bus 469. The internal processor 460, together with the write state machine (not shown) function, will cause the new data to be written into hidden storage 405 or 410. Processing block 515 shows the internal processor 460 that checks the BSB 415 and determines that bank 1 405 is the erased bank, and therefore available to store new data. In processing block 520, the internal processor 460 writes the new data to bank 1 405 at the locations defined by the host 250. The data path is from the write buffer 470 to the multiplexer 480, and then onto the hidden storage input bus 481. The internal processor 460 transfers the old data stored in bank 0 410 to bank 1, 405 retaining the address locations as the data is moved from bank 0 410 to 1 405. For example, if data is located at location FFF0 in bank 0 410, it is transferred to location FFF0 in bank 1 405 in processing block 525. However, the address locations pertaining to the new data are skipped in this process so as not to contaminate the new data. The data transferred includes the password storage 411, all old files for user (n), and all files located in the other user spaces. During this process, none of this data can be externally available on the output data bus 255. Bank 1 405 contains the new data just written by the host, and the data transferred from bank 0 410. In processing block 530, the BSB 415 is erased, which causes it to change state from 0 to 1. This identifies bank 1 405 as the new current bank. In cases where the BSB 415 is changing state from 1 to 0, the BSB 415 does not need to be erased. The internal processor can directly write a 0 to the BSB 415. The BSB 415 identifies bank 1 405 as the current bank, and bank 1 405 contains old and new data. In processing block 535, the internal processor 460 erases bank 0 410, making it ready to accept the next new data. Note that the banks can be erased independently. However, individual user spaces and password space are not individually erasable. The process completes in block 599.

Bad Password Counter

The Bad Password Counter (BPC) 240 is a non-volatile register used to count and maintain a cumulative record of incorrect password entries. The internal processor controls the BPC 240. On initial power up, the BPC 240 is configured so that all bits in the register are set to "1". Individual bits are then set to "0" as bad passwords are validated. In system applications, a user enters a password after being prompted by the operating system (OS) or an application running under the OS. The OS sends a "password verify" command to the flash. The command identifies the user (user 1, 2 or 3) and includes the entered password. The internal processor 260 compares the entered password with the stored password value. If the entered password matches the stored password, the internal processor 260 sets the PW bit for that user, enabling access to that user's hidden storage. In addition, the internal processor 260 resets the BPC 240 to all "1"s if that is not the state of the BPC 240. If a bad password was not entered since the last password entry, this is not required. If the password does not match, the internal processor 260 notifies the host by a status message and decrements the BPC value for that user.

BPC Example

Figure 6:
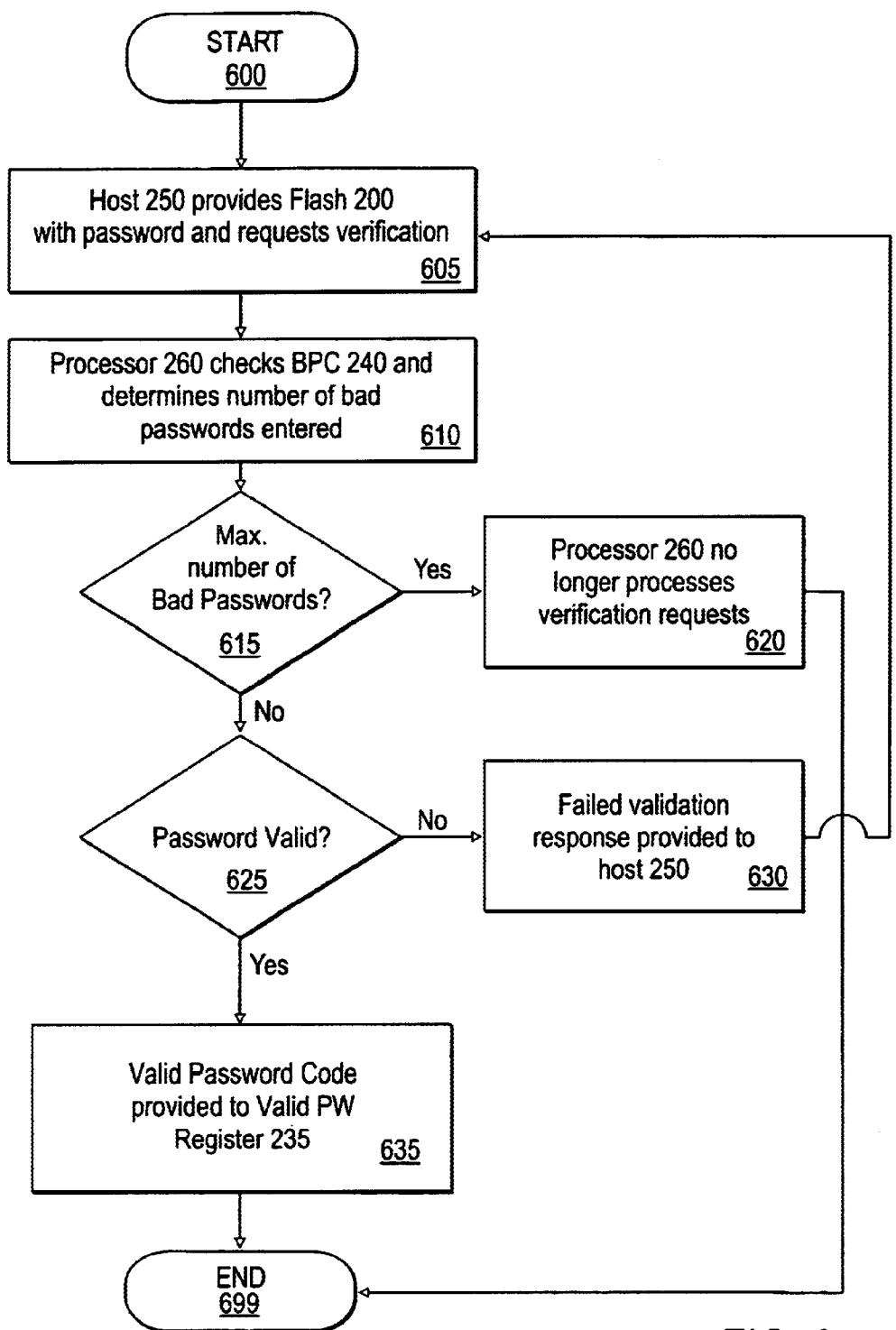
FIG. 6 illustrates a flow diagram of BPC processing.

This example is focused on user 1, but the same process applies for all other users. The initial conditions assume that a valid password was created for user 1, and that no bad passwords have been entered for user 1. As a result, the user 1 BPC 240 has a value of 1,1,1. FIG. 6 illustrates a flow diagram of BPC processing. The process begins in block 600. In processing block 605, an operator provides a bad password for user 1 to the host and the host issues a verify password for user 1 to the flash. The command includes the entered (bad) password. In processing block 610, the internal processor inputs the command and the entered password. The internal processor 260 checks the User 1 BPC 240. In this case, the value is 1,1,1. This indicates that no bad passwords for user 1 have been entered. In decision block 615, the processor 260 determines if the maximum number of bad passwords have already been entered. Since the maximum number of bad passwords has not been satisfied, the internal processor 260 continues to process the command. Flow continues to decision block 625. The internal processor 260 checks the entered bad password against the valid password for user 1 in decision block 625 and in the present example determines that the passwords do not match. Since the entered password is bad, the internal processor 260 decrements the user 1 BPC 240. The User 1 BPC value 240 is therefore changed from 1,1,1 to 1,1,0. In processing block 630, the internal processor 260 provides a status response to the host 250 indicating that the password is invalid, and flow returns to block 605.

An operator provides a second bad password for user 1 to the host 250 and flow continues through block 610 as described above. In processing block 610, the internal processor checks the User 1 BPC. In this case, the value is now 1,1,0. Since the maximum number of bad passwords has not been satisfied, the internal processor 260 continues to process the command and flow continues through block 625 as described above. Since the entered password is bad, the internal processor 260 decrements the user 1 BPC 240. The User 1 BPC 240 value is therefore changed from 1,1,0 to 1,0,0. In processing block 630, the internal processor 260 provides a status response to the host 250 indicating that the password is invalid, and flow returns to block 605.

An operator provides a third bad password for user 1 to the host 250 and flow continues through block 610 as described above. In processing block 630, the internal processor 260 checks the User 1 BPC 240. In this case, the value is now 1,0,0. Since the maximum number of bad passwords has not been satisfied, the internal processor 260 continues to process the command and flow continues through block 625 as described above. Since the entered password is bad, the internal processor 260 decrements the user 1 BPC 240. The User 1 BPC 24b value is therefore changed from 1,0,0 to 0,0,0. In processing block 630, the internal processor 260 provides a status response to the host indicating that the password is invalid, and flow returns to block 605 and continues through block 610. In decision block 615, at this point the user 1 BPC 240 value is 0,0,0, indicating that the maximum number of bad password entries for user 1 has been satisfied and flow passes to block 620. From this time forward, the internal processor will not process additional verify password commands for user 1 and the process ends in block 699.

The example above was based on three consecutive bad password entries without entry of a valid password. The BPC 240 keeps a running count of bad passwords, and three consecutive bad passwords for a specific user must be entered before access to that user's hidden storage is denied. This is true even if the consecutive bad password entries are separated by a power down. The BPC 240 for a specific user is reset to all "1"s when a valid password is entered in processing block 635 and a valid password code is provided to register 235.

Since the BPC 240 is non-volatile (flash based), the BPC 240 must be managed similar to the way hidden storage is managed. A second BPC register 240 may be provided to allow the BPC 240 for one user to be erased while the BPC 240 for all others is maintained. For example, user 1 enters a valid password after entering a bad password. As a result, the BPC 240 for user 1 should be reset to all 1's. But the BPC 240 for users 2 and 3, and for the recovery password need to be maintained—they should not be erased. Assuming the second BPC 240 register is erased (all 1s), the internal processor 260 write the BPC for users 2 and 3, and the recovery password into the second BPC. As is the case with hidden storage, a single bit controlled by the internal processor 260 indicates which register is valid at any time.

Figure 7:
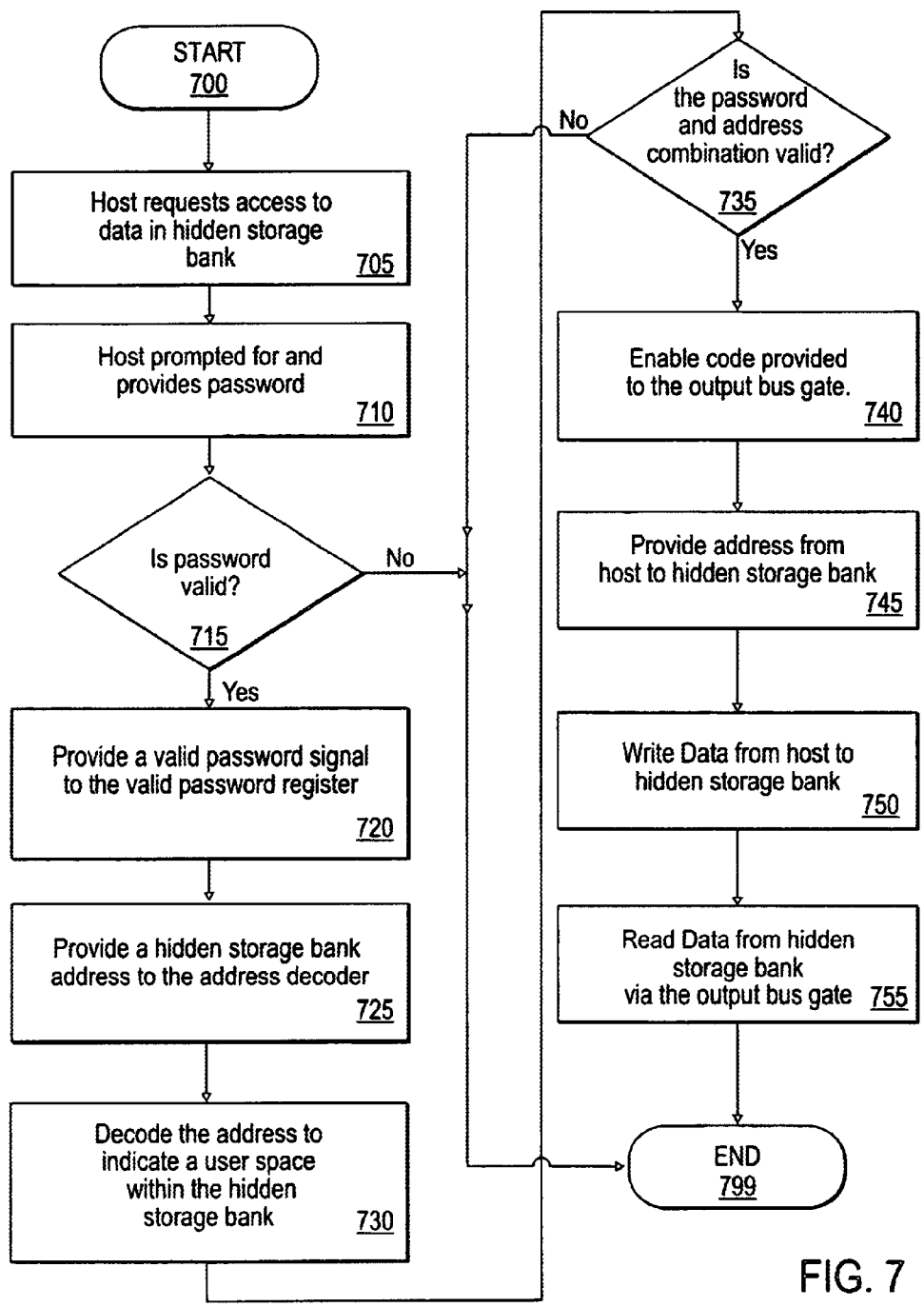
FIG. 7 illustrates the processing flow of one embodiment of flash device 200.

FIG. 7 illustrates the processing flow of one embodiment of flash device 200. The process starts in block 700. In processing block 705, host 250 requests access to data in hidden storage banks 205 and 210. The host 250 is prompted for and an operator provides a password in processing block 710. In decision block 715, processor 260 determines if the password is valid according to the BPC 240 flow process described above. If the password is invalid, flow ceases in block 799. If the password is valid, flow continues to processing block 720.

In processing block 720, the processor 260 provides a valid password signal to the valid password register 235 that sets the bits EN1, EN2, and EN3 that are provided to Address decode 230. In processing block 725, host 250 provides address decoder 230 with an address in hidden storage 205 and 210 that the operator wishes to access. The address is decoded in processing block 730 according to the process described above, to determine the specific user assigned to the space referenced by the address.

In decision block 735, processor 260 determines if the password and address combinations are valid. If the combination is not valid, the process ends in block 799. If the combination is valid, output enable logic 320 provides an enable code to the output bus gate 225 in processing block 740. The memory location address is provided to hidden storage 205 and 210 in processing block 750. If the host 250 requested to write to hidden storage 205 and 210, a write operation accrues in processing block 750. If a read operation was requested, data is read from hidden storage 305 and 310 via the output bus gate 225 in processing block 755. The process ends in block 799.

Hidden Storage Access

In this scheme, passwords are stored and managed in the flash. Once a password is stored in flash, the password is never externally available. A small set of password related commands, already defined for protected storage, can be used for the password management. Access to hidden storage memory 120 is based upon entry of a valid user password. Using the "enter password command", a password is written by the host 200 into the write buffer at an address within the user's hidden storage space 120 and compared with the valid password for that user's hidden storage space 120. If the comparison indicates that the password is valid, then the μprocessor 260 asserts a bit indicating a valid password for user(n) has been entered. The asserted bit performs two functions. First, the bit is used to condition the address decode logic to hidden storage. If the valid password for user(n) bit is asserted, and the decoded address for a read/write instruction is decoded to be part of user(n)'s hidden storage, then the decoded address lines are passed through to the hidden storage memory array and read/write access is enabled. Furthermore, if the operation being performed is to read data, the same conditioning logic is used to enable the data bus buffers, allowing the contents of the addressed memory locations to be put on the data bus. By providing a signal to block the bus output, one can guarantee that private data in hidden storage is never leaked out to the bus unless a password is present. In addition, if the address provided is to read any part of memory space outside of hidden storage, the bus output is enabled.

The Recovery Password

The recovery password doesn't provide access to hidden storage 210, but allows the BPC 240 to be reset. This allows a user an opportunity to recover the use of hidden storage 210 that has been disabled as a consequence of the maximum number of bad passwords being realized. When the recovery password is entered, the BPC 240 is reset to all "1"s. Assuming that the BPC 240 is implemented in flash memory, this is achieved by erasing the contents of the BPC 240. The recovery password does not allow selective reset of individual user segments of the BPC 240.

System Administrator Capabilities and Password

In one embodiment, the Hidden storage system also provides password protected system administrator access. A system administrator, after entering a valid system password, can reset the contents of hidden storage 120, erasing its contents. However, the system administrator does not have read access to hidden storage 120, and cannot modify or add to the contents of hidden storage 120.

The system administrator function is not likely to be invoked unless the device that contains the hidden storage is lost. And if the device has been lost, then the system administrator must reset the entire contents of hidden storage 120. Individual users that need to erase their hidden memory can do so after they enter their valid password.

Like the recovery password, the system administrator password (SAP) doesn't provide access to hidden storage 120. The SAP allows the contents of all hidden storage 120 to be erased so that user's private information cannot be recovered. This feature would be used when a product (for example, a cell phone) is returned to a service provider. The service provider can erase hidden storage 120 and consequently could reuse the device. The previous user's secrets would be erased and would not ever be exposed.

The functions accessed by the SAP should not be available to a user. These capabilities should be reserved for a system administrator. The OS embedded in products should not allow users to have access to the system administrator privileged functions, so the OS should not query operators for the SAP. System administrator access to hidden storage should be invoked only if special test or administration operations are invoked. When these modes are invoked, test/maintenance software can query for the SAP. Users should not be able to enter this mode. Based on this usage model, a bad password count for the SAP should not be maintained.

Hidden Storage Memory Architecture

Single Memory Architecture

In one embodiment of hidden storage memory are architecture all of the user space in hidden storage, including password storage, is treated as one memory partition.

In the single memory architecture, user space and password storage are managed together as a single erase block. The space is virtually partitioned into three user arrays and password storage, but the virtual partitions cannot be individually erased.

The single memory architecture is similar to the approach to update and manage protected storage passwords. If a new file is being written to an (empty) erased portion of hidden storage, the file can be written without the need to utilize the non-volatile swap space. But if the command is to update (modify) an existing file, and hidden storage is full, it is necessary to utilize the non-volatile swap memory. The contents of the present hidden storage along with the updated file are written into the swap storage space. If bank 0 is the current hidden storage bank and a file modify operation is required, the modified file is written into bank 1, and all other files, including passwords are also written into bank 1. Subsequent to the bank write, the status of the non-volatile bank select bit is updated to point to the new current memory bank (in this case, now bank 1). The previous current memory can then be reclaimed (erased) so as to be ready for the next operation that requires a swap. This architecture uses bank 0 and bank 1 of equal size.

Partitioned Memory Architecture

In the another embodiment, individual user space and password storage are treated as unique memory partitions. These options are discussed in further detail below.

Figure 8:
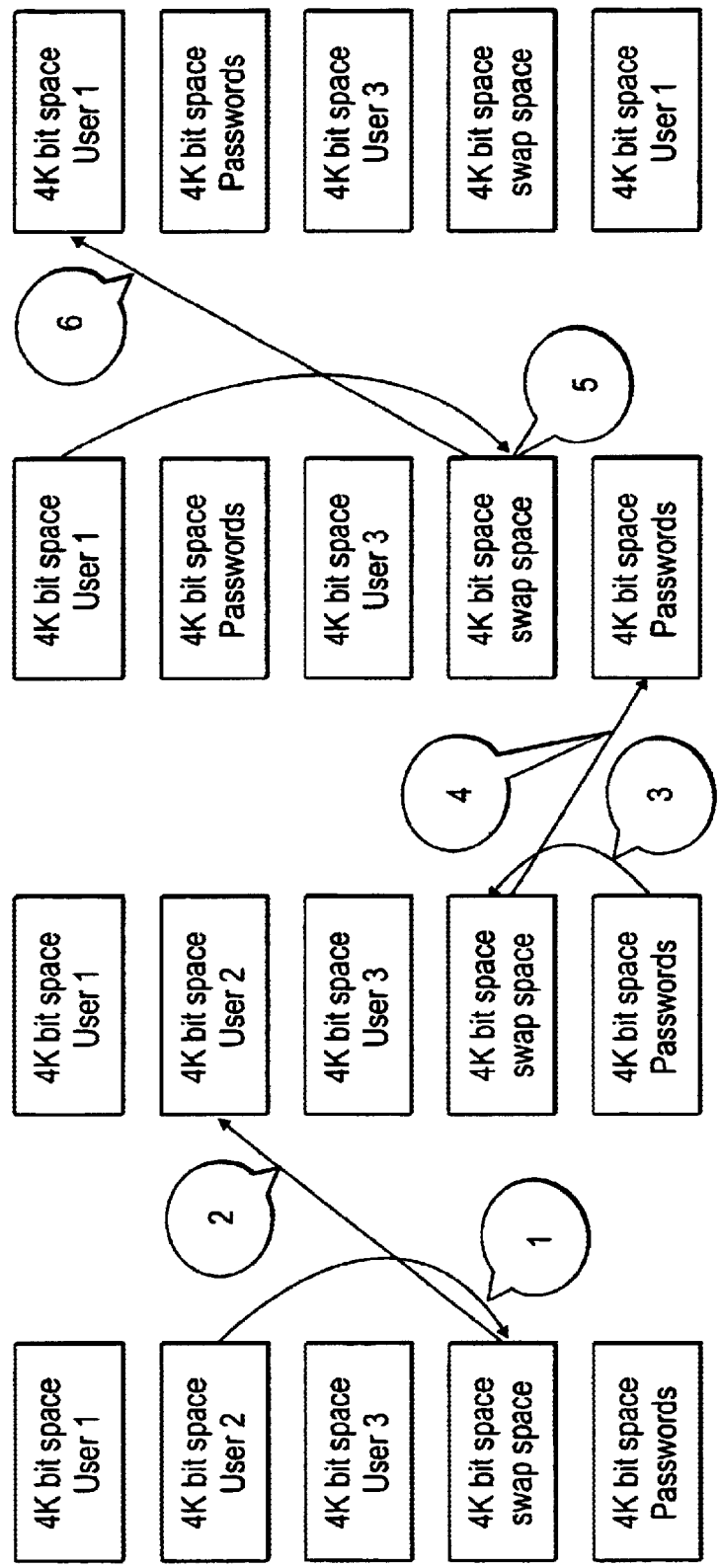
FIG. 8 illustrates a partitioned memory architecture and transition example.

In the partitioned memory architecture, individual user spaces can be erased without perturbing the contents of other user space. Similarly, password space can be erased without impacting any user space. FIG. 8 illustrates a partitioned memory architecture and transition example. In this architecture variant, hidden storage can be envisioned as being comprised of five, blocks of memory. Three blocks are the current user space for users one, two, and three, a fourth block stores the passwords, and one block is spare, to be used as future swap space. Bubble 1 shows that when a file for user(n) is being modified, the updated file, along with other files belonging to user(n) are copied into the swap space. In bubble 2, Hidden storage for user(n) is erased. Next, the contents in the swap space are copied back into user(n)'s hidden storage space. After the operation is complete, swap space is erased so as to be ready for the next modify/write operation that requires the use of swap space. In this architecture, all hidden storage partitions may be the same size, as the swap space needs to be the size of the largest user hidden storage space.

In yet another embodiment, a variant on this approach allows the swap space to move as data changes. Based on the example above, the result of user 2 making modifications to his files would result in user 2 hidden storage being moved to swap space, and this swap space would consequently be reidentified as user 2 hidden storage. The old user 2 hidden storage would be erased and would become the new swap space. In this scheme, hidden storage for users doesn't occupy fixed addresses, but moves as files are modified.

Storage per User

Each user requires some amount of hidden storage that must be erasable, modifiable, and of course, protectable. The amount of storage per user and the number of users drive the size of hidden storage 390. The same factors drive the amount of swap space required and influence how swap space is managed. To determine the amount of hidden storage per user, one must estimate the type and size of private data that needs to be stored. For example, bits appears to provide adequate storage for a user's keys and some critical information pertaining to that user. Hidden storage is not intended to be used as mass storage for files—its purpose is to provide private storage for private data. For that critical data, bits seems to be sufficient. However, if there is little impact to die size, hidden storage should be increased to bits per user.

Number of Users

The number of users drives the number of user spaces required. Each user has a password that must be stored in non-volatile memory, and each user owns memory space that must be selectable and modifiable without effecting the contents of other user's memory.

The target markets yield different usage models. A cellular phone owned by an individual used for business purposes would likely have a single user. But the same cell phone purchased and used by a family could easily have multiple users with different user spaces, similar to the way a PC can be configured for different family members (and with different capabilities and privileges). The dominant usage model with PCCs is for each PCC to have a single owner. One can visualize a usage model for the STB involving multiple users with different personalities and privileges. Providing one hidden storage space protected with a single password does not provide enough flexibility to address the more complex usage models.

Providing the facility for multiple users has an additional benefit. For those cases where the single user model applies, the user can potentially utilize all of hidden storage, thereby gaining access to all of hidden storage. The user could protect each hidden storage space with the same password, or could use different passwords for each user space at their option.

Tamper Penalty

Hidden storage needs to be protected against an exhaustive search attack in which an adversary simply guesses every possible password until a match is made with a valid password. A penalty may be invoked after allowing a limited number of incorrect passwords to be entered. Since scenarios in which hidden storage will find application is long term storage of an individual's secrets, some mechanism to protect against an exhaustive attack should be implemented. However, the sophistication of the protection scheme needs to be evaluated against the threat. Most likely, a non-volatile register (flash based) will be required to maintain a running count of the number of incorrect password entries. After reaching a preset number of incorrect entries, the flash could disable hidden storage. But the system architecture of the host must also be considered. Unlike a removable SIM, flash memory is embedded in the device, and cannot easily be reset or replaced. And main memory cannot be disabled, regardless of the status of hidden storage.

The primary threat to hidden storage occurs if a user's password is guessed. In that case, the user's private data is compromised. This could include financial information, cryptographic keys, sensitive business data and the like. The threat being protected by the system password is not as significant. While illicit erasure of the contents of hidden storage is certainly a nuisance, it does not compromise the user's information. But it is clearly important to limit the chance of success from a brute force password attack.

To limit the chance of success of this kind of attack, one must limit the number of password guesses allowed without penalty. The suggested approach is to allow three consecutive incorrect password entries before disabling access to hidden storage. For example, user 1 enters his password incorrectly two consecutive times. If the password is entered correctly on the third attempt, user 1 is granted access to user 1's hidden storage. If the password is entered incorrectly a third consecutive time, the access to user 1's space is permanently denied. The criteria used to permanently deny access to a specific user's hidden storage is three consecutive incorrect password entries. The running total must be stored in non-volatile memory to prevent attacks in which the adversary makes guesses and then removes power before trying more passwords. The system administrator password works in the same manner. A running total of three incorrect password entries are permitted. In one embodiment, the penalty is to disable system administrator access and privileges only, resulting in the loss of capability to erase all of hidden storage, but with no impact to the normal operations granted to individual users with a valid password. In another embodiment, all of hidden storage is disabled, including access by individuals. Another embodiment allows administration capabilities, including password entry, to be invoked only in special maintenance modes of operation not generally available to users.

Finally, there needs to be a recovery mechanism to protect against cases where the user, by mistake, enters enough incorrect passwords to trigger the penalty mechanism. The proposed solution is to provide a recovery password. By entering this password, the cumulative error count for all other passwords is reset to the maximum value. This allows the capability to restore access to hidden storage without seriously compromising password-based protection of hidden storage. Like the other passwords, the recovery password is protected by a cumulative count with a threshold value that when reached, disables the recovery function.

The software implementing embodiments of the present invention can be stored in hidden storage 120 or any other storage medium accessible to processor 401. This software may also be resident on an article of manufacture comprising a computer readable mass storage medium, or propagated digital signal having computer readable program code embodied therein and being readable by the mass storage device and for causing the processor 401 to perform digital information library transactions and protocols in accordance with the teachings herein.

In the forgoing specification, the invention has been described with reference to specific exemplary embodiments thereof. If will, however, be evident that various modifications and changes may be made thereto without deporting from the broader spirit and scope of the invention as set forth in the appended claims. The specification and drawings are, accordingly, to be regarded in an illustrative rather than a restrictive manner.

What is claimed is:

1. A memory device comprising:
   a main flash array;
   an internal processor to execute programming code and having a write state machine; and
   a hidden storage area connected to the main flash array, wherein the hidden storage area can not be accessed without a valid password, and
   wherein the hidden storage area comprises a bad password counter that counts a number of times the internal processor is unable to verify the password.

2. The memory device of claim 1, wherein the hidden storage area comprises one or more hidden storage memory banks.

3. The memory device of claim 2, wherein the hidden storage memory banks are divided into one or more user spaces and a password space.

4. The memory device of claim 3, wherein the valid password allows accesses to only one of the user spaces.

5. The memory device of claim 2, wherein the hidden storage memory banks include a swap space to copy data between the hidden storage memory banks.

6. The memory device of claim 2, wherein the hidden storage area further comprises a bank selector to select a hidden storage memory bank.

7. The memory device of claim 2, wherein the hidden storage area further comprises an output bus gate to prevent access to the hidden storage memory banks.

8. The memory device of claim 7, wherein the hidden storage area further comprises an address decoder to open the output bus gate when provided the valid password and a valid memory address within the hidden storage memory banks.

9. The memory device of claim 8, wherein the valid memory address is provided by a host.

10. The memory device of claim 7, wherein the hidden storage area further comprises a valid password register to indicate a password has been verified by an internal processor.

11. A method, comprising:
    storing one or more valid passwords in a hidden storage memory bank embedded within a memory device;
    writing a password from a host into the hidden storage memory bank;
    verifying the validity of the written password against the valid stored passwords with an internal processor embedded within the memory device to execute programming code and having a write state manager; and
    counting the number of times the internal processor is unable to verify the password with a bad password counter included in the memory device.

12. The method of claim 11, further comprising permitting access to read from the hidden storage memory bank if the password is verified.

13. The method of claim 12, further comprising permitting access to write to the hidden storage memory bank if the password is verified; and a valid address in the hidden storage memory bank is provided.

14. The method of claim 11, further comprising dividing the hidden storage memory block into one or more user spaces, a password space, and a swap space.

15. The method of claim 11, further comprising writing a recovery password that allows the bad password counter to be reset.

16. The method of claim 11, further comprising writing a system administrator password that allows the hidden storage memory bank, a recovery password, and the bad password counter to be reset.

17. A computer readable medium having stored thereon a plurality of instructions, said plurality of instructions when executed by a computer, cause said computer to perform:

storing one or more valid passwords in a hidden storage memory bank embedded within a memory device;

writing a password from a host into the hidden storage memory bank; and verifying the validity of the written password against the valid stored passwords with an internal processor embedded within the memory device capable of executing programming code and having a write state machine; and counting the number of times the internal processor is unable to verify the password with a bad password counter included in the memory device.

18. The computer-readable medium of claim 17 having stored thereon additional instructions, said additional instructions when executed by a computer, cause said computer to further perform permitting access to read from the hidden storage memory bank if the password is verified.

19. The computer-readable medium of claim 18 having stored thereon additional instructions, said additional instructions when executed by a computer, cause said computer to further perform permitting access to write to the hidden storage memory bank if the password is verified; and a valid address in the hidden storage memory bank is provided.

20. The computer-readable medium of claim 17 having stored thereon additional instructions, said additional instructions when executed by a computer, cause said computer to further perform dividing the hidden storage memory block into one or more user spaces, a password space, and a swap space.

21. The computer-readable medium of claim 17 having stored thereon additional instructions, said additional instructions when executed by a computer, cause said computer to further perform writing a recovery password that allows the bad password counter to be reset.

22. The computer-readable medium of claim 17 having stored thereon additional instructions, said additional instructions when executed by a computer, cause said computer to further perform writing a system administrator password that allows the hidden storage memory bank, a recovery password, and the bad password counter to be reset.

23. A memory device comprising:

a main flash array;

an internal processor to execute programming instructions;

a hidden storage area connected to the main flash array, wherein the hidden storage area can not be accessed without a valid password; and a bad password counter included in the hidden storage area that counts the number of times the internal processor is unable to verify the password.

\* \* \* \* \*

UNITED STATES PATENT AND TRADEMARK OFFICE
CERTIFICATE OF CORRECTION

| | | |
|---|---|---|
| PATENT NO. | : 6,681,304 B1 | Page 1 of 1 |
| DATED | : January 20, 2004 | |
| INVENTOR(S) | : Vogt et al. | |

It is certified that error appears in the above-identified patent and that said Letters Patent is hereby corrected as shown below:

Column 7,
Line 25, delete "24b" and insert -- 240 --.

Signed and Sealed this

Twenty-second Day of June, 2004

JON W. DUDAS
*Acting Director of the United States Patent and Trademark Office*